United States Patent
Henneberg et al.

(10) Patent No.: US 8,380,256 B1
(45) Date of Patent: Feb. 19, 2013

(54) FAILSAFE PROTECTION SYSTEM FOR A DISTRIBUTED TELECOMMUNICATIONS SITE

(75) Inventors: Mark Henneberg, Olathe, KS (US);
Kevin Kenny, Ashburn, VA (US);
Kenneth J. Graham, Parkville, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1288 days.

(21) Appl. No.: 11/778,703

(22) Filed: Jul. 17, 2007

(51) Int. Cl.
*H04B 1/38* (2006.01)
*H02J 3/12* (2006.01)
*G05F 1/10* (2006.01)
*G06F 1/00* (2006.01)

(52) U.S. Cl. .................. 455/572; 323/234; 713/300

(58) Field of Classification Search .................. 455/572
See application file for complete search history.

(56) References Cited

U.S. PATENT DOCUMENTS

| | | | | |
|---|---|---|---|---|
| 5,565,714 A * | 10/1996 | Cunningham | ................ | 307/112 |
| 5,991,885 A * | 11/1999 | Chang et al. | .................. | 713/300 |
| 6,243,818 B1 * | 6/2001 | Schwan et al. | ................ | 713/300 |
| 6,836,092 B2 * | 12/2004 | Sivertsen | ....................... | 318/639 |
| 2006/0091865 A1 * | 5/2006 | Lehr et al. | ....................... | 323/234 |
| 2007/0069586 A1 * | 3/2007 | Queveau et al. | ................ | 307/66 |

* cited by examiner

*Primary Examiner* — Patrick Edouard
*Assistant Examiner* — Timothy Pham

(57) ABSTRACT

A failsafe protection system for a distributed telecommunications site ties power shut off to a network interface unit to power supply conditions at a base transceiver station. In one aspect, the system is integrated with circuitry at the distributed telecommunications site, and includes an electrical power supplying device, a low voltage disconnect and a relay coupled with a DC bus. Additionally, the failsafe protection system includes a first circuit pathway coupling the base transceiver station electronics to the low voltage disconnect and a second circuit pathway coupling the network interface unit to the DC bus through the relay. Both the low voltage disconnect and the relay selectively control the coupling of the base transceiver station and the network interface unit, respectively, with the DC bus.

11 Claims, 3 Drawing Sheets

US 8,380,256 B1

FAILSAFE PROTECTION SYSTEM FOR A DISTRIBUTED TELECOMMUNICATIONS SITE

SUMMARY

The present invention is defined by the claims below. Embodiments of the present invention provide a system for a distributed telecommunications site functioning to minimize the damage on equipment located at the telecommunications site during a period of electrical power drain.

In one aspect, a failsafe protection system is provided. The system is integrated into circuitry located at the distributed telecommunications site where a base transceiver station enables wireless communication with a plurality of portable communication devices and a network interface unit connects the base transceiver station to a telecommunications network backbone. The failsafe protection system includes an electrical power supplying device, a low voltage disconnect and a relay coupled with a DC bus. Additionally, the failsafe protection system includes a first circuit pathway coupling the base transceiver station electronics to the low voltage disconnect and a second circuit pathway coupling the network interface unit to the DC bus through the relay. Both the low voltage disconnect and the relay selectively control the coupling of the base transceiver station and the network interface unit, respectively, with the DC bus. More particularly, the relay senses the magnitude of the voltage across the low voltage disconnect and selectively opens the second circuit pathway to prevent electrical current flow to the network interface unit from the DC bus upon the voltage across the low voltage disconnect reaching a predetermined value indicative of the low voltage disconnect operating to decouple the base transceiver station from the DC bus.

According to another aspect, a system is provided for inhibiting drain on a DC electrical power supplying device connected with telecommunications electronics at a distributed site, where the site includes a base transceiver station enabling wireless communication with a plurality of portable communication devices and a network interface unit connecting the base transceiver station to a telecommunications network backbone. The system includes a DC bus coupled to the DC electrical power supplying device, as well as a first circuit component and a second circuit component. The first circuit component includes a low voltage disconnect connected in series between the DC bus and the base transceiver station to selectively control the flow of DC electrical power to the base transceiver station. Correspondingly, the second circuit component includes a relay connected in series between the DC bus and the network interface unit. The relay is operative to selectively control the flow of DC electrical power to the network interface unit by sensing the magnitude of the voltage across the low voltage disconnect and selectively prevent electrical current flow to the network interface unit from the DC bus upon the voltage across the low voltage disconnect reaching a predetermined value indicative of the low voltage disconnect operating to decouple the base transceiver station from the DC bus.

Additional features of the present invention will in part be set forth in the description that follows or become apparent to those who consider the attached figures or practice the invention.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Embodiments of the present invention relate to a system providing failsafe protection for equipment located at a distributed telecommunications site. In particular, the system is operative during a period of electrical power drain by such telecommunications equipment such that when a certain direct current (DC) voltage value is measured that is indicative of a lower power situation, the flow of electric current to such equipment is essentially shut off. For instance, in one embodiment, upon sensing that DC electrical power supplied to equipment of a base transceiver station (BTS) has dropped to a certain value or magnitude, a first device disconnects the BTS equipment from a main power circuit. Responsive to the disconnection of the BTS equipment from the main power circuit, a second device disconnects a network interface unit (NIU) at the telecommunications site from the main power circuit. At this point, normal communications activities enabled by the BTS equipment and the NIU (e.g., cellular telephone calls and other wireless communication actions) are disabled. The first device and second devices of the system may be configured to automatically reconnect the BTS equipment and NIU, respectively, when sufficient DC electrical power is restored on the main power circuit, or alternatively, may require a manual reconnection step by an authorized individual.

Figure 1:
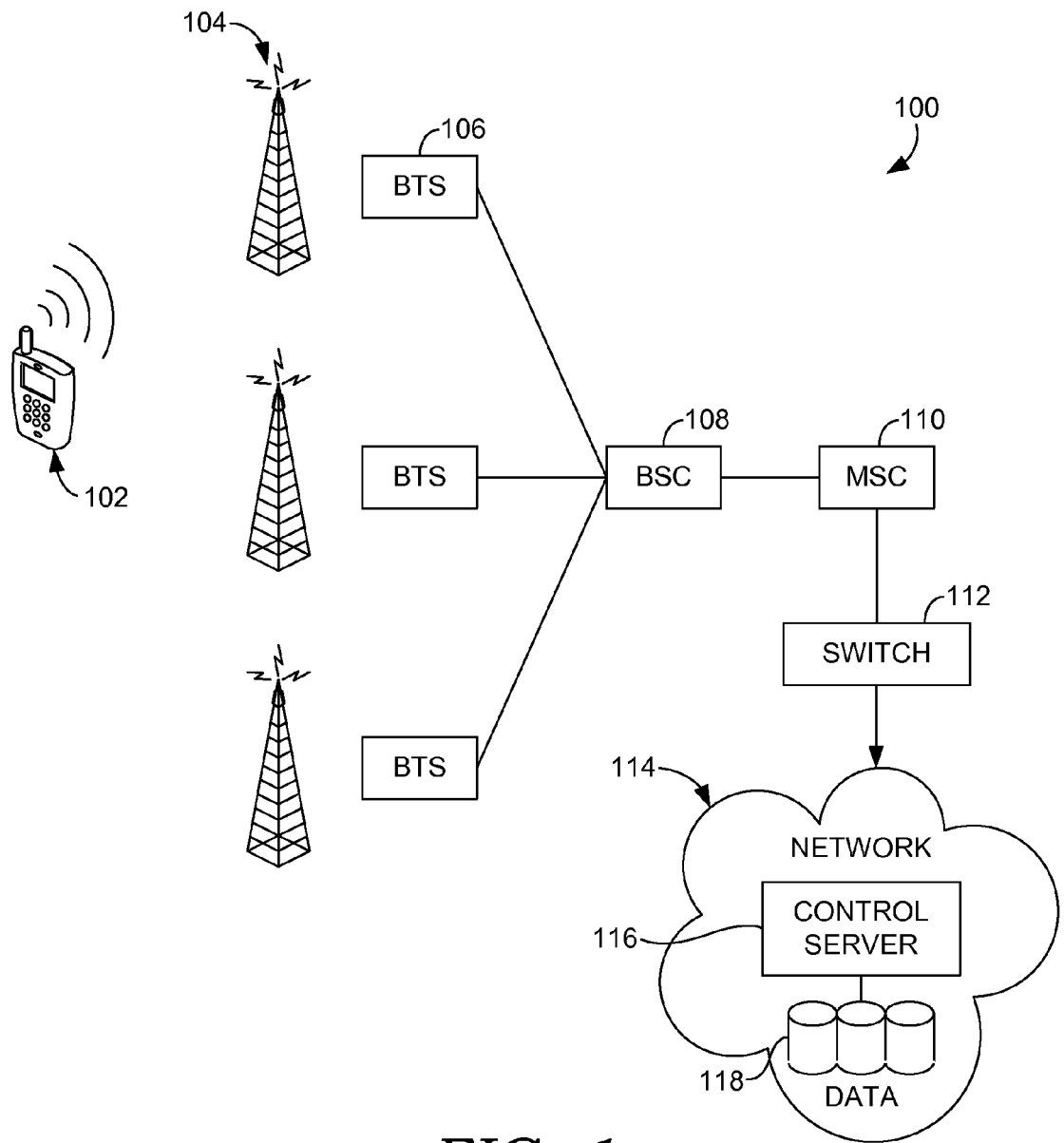
FIG. 1 is a schematic view of an exemplary wireless communications environment suitable for use in implementing the present invention.

Turning now to FIG. 1, an exemplary wireless telecommunications network environment 100 is depicted. In the environment 100, a user's cellular or mobile communications device 102 (e.g., mobile phone, personal digital assistant, etc.) communicates over established radio frequencies through a cell tower 104 having a base transceiver station (BTS) 106, a number of which are typically connected to a base station controller (BSC) 108. The BSC 108 manages the communication between a number of BTSs 106 and a limited number of mobile phones 102 compatible with the wireless network 100. The BSC 108 connects to a mobile switching center (MSC) 110 acting as a telephone exchange to handle the mobile communications activity through the associated one or more BSCs 108 while connecting as needed through a telecommunications switch 112 to the public switched telephone network 114 or other data network. The telephone network 114 includes a number of control servers 116 that manage the flow of data signals through the network 116 and connect as needed to a number of databases 118 that include information such as registrations of mobile communications device 102 and associated accounts, and other information.

Figure 2:
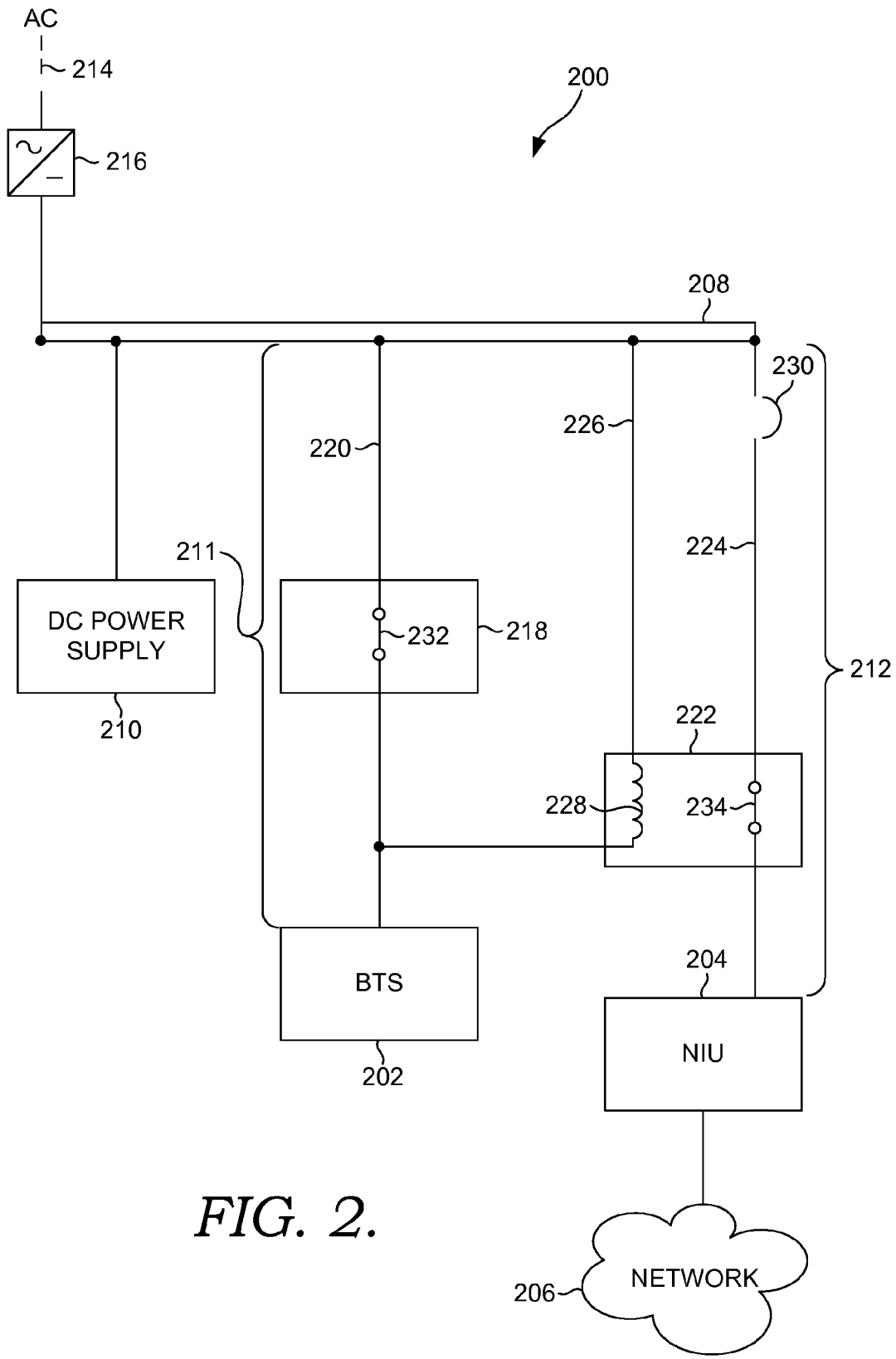
FIG. 2 is a schematic view of a failsafe protection system for a distributed telecommunications site where associated telecommunications equipment is coupled to a power supply, in accordance with an embodiment of the present invention.
Figure 3:
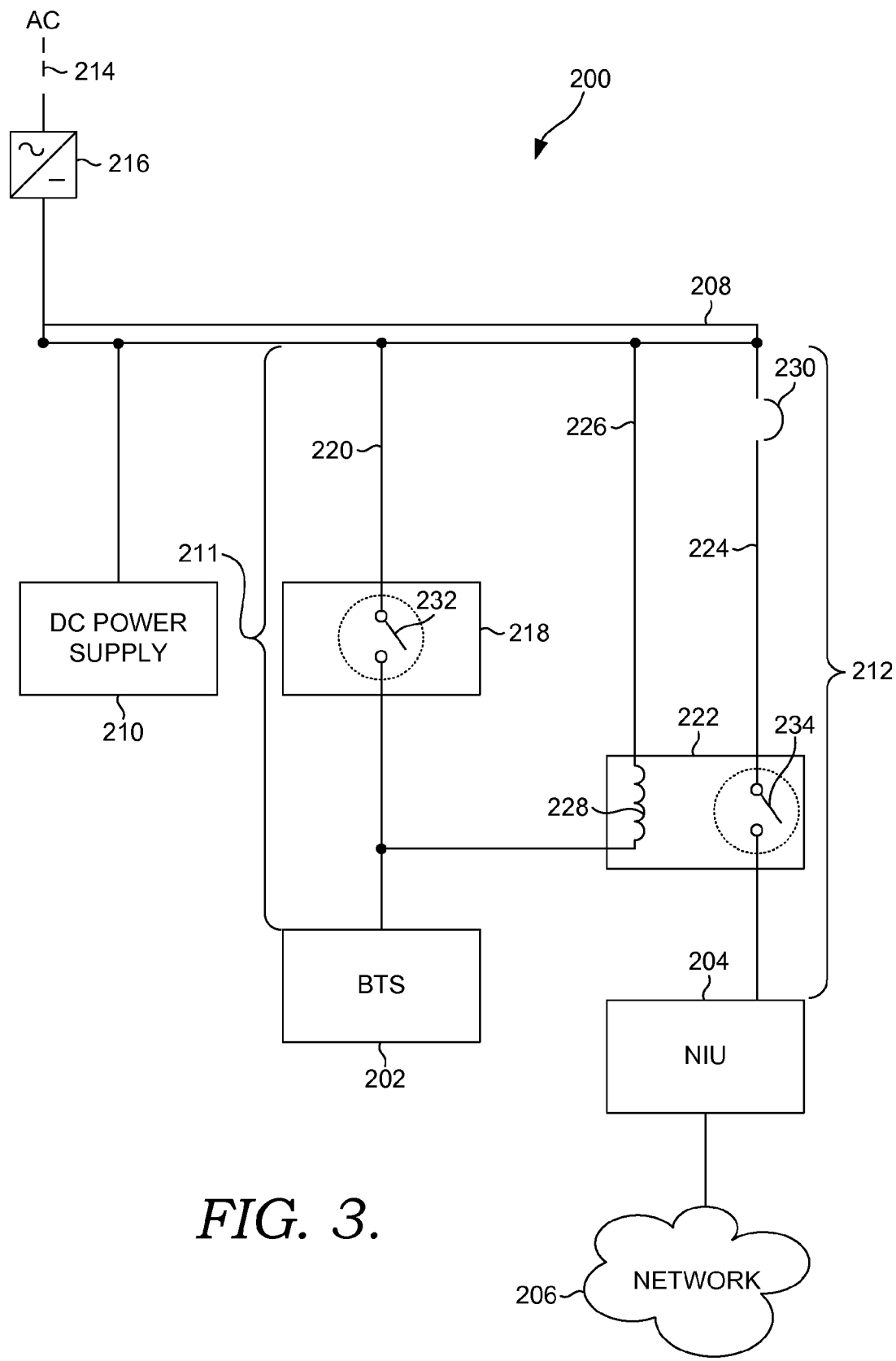
FIG. 3 is a schematic view of a failsafe protection system for a distributed telecommunications site where associated telecommunications equipment is decoupled from a power supply, in accordance with an embodiment of the present invention.

With additional reference to FIGS. 2 and 3, one embodiment of a failsafe protection system 200 is depicted. The system 200 is integrated with equipment located at a distributed telecommunications site, such as a base transceiver station 202 (i.e., BTS 106 of FIG. 1) and a network interface unit 204. It should be understood that the network interface unit 204 may be integrated with any number of components of the wireless telecommunications network environment 100 downstream in a communications pipeline from the BTS 106, such as with the BSC 108, MSC 110 and switch 112. Additionally, although not expressly shown in FIG. 2, the BTS 202 and NIU 204 are in communication with one another to enable mobile communications at the distributed telecommunications site and connection to a telecommunications network backbone 206 (i.e., network 116 of FIG. 1), as those of skill in the art appreciate.

The system 200 includes a DC bus 208, a DC power supply 210, a first circuit component 211 and a second circuit component 212. Under normal operating conditions at the distributed telecommunications site, telecommunications equipment (e.g., BTS 202, NIU 204, and other equipment) may be powered by direct current derived from an alternating current power source 214, such as an electrical utility or other generation or supply source. In such a case, the AC power is converted to DC power by a rectifier 216, such as a switch mode rectifier, which is electrically coupled to the DC bus 208. Alternatively, the DC power supply 210 or other DC power source directly electrically coupled to the DC bus 208 provides electrical power for the telecommunications equipment. As one example, a fuel cell or other DC power generation or supply device may power the telecommunications equipment during normal operating conditions for the telecommunications site. When power is lost for normal operating conditions, the DC power supply 210, acting as a backup power supply, provides the needed electrical power for continuing operation of the BTS 202, NIU 204, and other telecommunications equipment at the site. In one arrangement, the DC power supply 210 may take the form of one or more fuel cells or batteries, such as a set of lithium metal polymer batteries.

Ideally, the DC power supply 210, acting as a backup power supply, provides at least about 42 VDC to the BTS 202 when the primary power supply is not available to the DC bus 208. However, as the DC power supply 210 is drained over time without return to normal operating conditions, damage may result to the supply, in addition to performance degradation for the BTS 202 and other telecommunications equipment. At some point (e.g., when 42 VDC or some other established value is not long being supplied by the DC bus 208) it can become beneficial to cease the draining of the DC power supply 210 by the BTS 202 and NIU 204 electrically coupled to the DC bus 208 via the first circuit component 211 and the second circuit component 212, respectively. Accordingly, the first circuit component 211 includes a low voltage disconnect 218 formed in series on a conductive pathway 220 between the DC bus 208 and the BTS 202, and the second circuit component 212 includes a relay 222 formed in series on a conductive pathway 224 between the DC bus 208 and the NIU 204. The relay 222 is also bridged between the DC bus 208 and a portion of the conductive pathway 220 between the low voltage disconnect 218 and the BTS 202 via conductive pathway 226, which includes an energizing coil 228. The low voltage disconnect (LVD) 218 selectively couples the BTS 202 to the DC bus 208 depending on the voltage realized by the LVD 218 from the DC bus 208. Similarly, the relay 222 selectively couples the NIU 204 to the DC bus 208 depending on the voltage condition across the conductive pathway 226 (and thus the energizing of the coil 228). In other words, if the LVD 218 opens the conductive pathway 220 to decoupled the BTS 202 from the DC Bus 208 because of a sensed low voltage condition, the relay 222 (via the coil 228) senses this occurrence has taken place, and correspondingly opens the conductive pathway 224 to decouple the NIU 204 from the DC bus 208. The energizing coil 228 thus realizes a voltage difference between the DC bus 208 and the BTS 202 upon the LVD 218 opening the conductive pathway 220, causing the conductive pathway 224 opening. Optionally, a breaker 230 may be formed in the conductive pathway 224 between the DC bus 208 and the relay 222, such that the conductive pathway 224 does not automatically reopen when the coil 228 is no longer energized (i.e., by continued draining of the DC power supply 210 or complete shut off of power supply to the DC bus 208). It should be understood that the term "sensing" or "measuring" of a particular voltage conditions does not requires any particular sensing or measuring mechanism in the associated circuits, but is contemplated to be accomplished by any electrical or electromechanical means.

In operation, when a main power supply is lost (e.g., AC power source 214) and a backup operation cycle is entered, the DC power supply 210 ensures that the DC bus 208 has sufficient electrical power for continued operations of the BTS 202 and NIU 204 (and optionally other telecommunications equipment) for a certain period of time. When the DC power supply 210 can no longer provide sufficient electrical power for either an acceptable level of performance of the telecommunications equipment, such as the BTS 202 and NIU 204, or otherwise, continued operations would be an undue burden for the DC power supply 210, the LVD 218 senses the low voltage condition and opens a switch 232 on the conductive pathway 220. This action decouples the BTS 202 from the DC bus 208. The relay 222 senses this condition through the energizing coil 228, and acts to open a switch 234 on conductive pathway 224 and thereby decouple the NIU 204 from the DC bus 208. Thus, the system 200 ensures that when power is lost to a base transceiver system 202, the network interface unit 204 also ceases operation.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. A failsafe protection system for a distributed telecommunications site, the distributed telecommunications site including a base transceiver station for enabling wireless communication with a plurality of portable communication devices and a network interface unit (NIC) for connecting the base transceiver station to a telecommunications network backbone, the system comprising:
- a DC bus;
- an electrical power supplying device coupled to the DC bus;
- a low voltage disconnect coupled to the DC bus;
- a first circuit pathway coupling electronics of the base transceiver station to the DC bus via a low voltage disconnect, wherein the low voltage disconnect selectively controls coupling between the base-transceiver-system electronics and the DC bus as a function of voltage realized at the DC bus, and wherein the low voltage disconnect decouples the base-transceiver-system electronics from the DC bus upon sensing a magnitude of the voltage realized by the DC bus is below a predetermined value;
- a conductive pathway coupled at a first end to the DC bus and coupled at a second end to a portion of the first circuit pathway located between the low voltage disconnect and the base-transceiver-system electronics, wherein an energizing coil is formed on the conductive pathway between the first end and the second end;
- a second circuit pathway coupling the NIC to the DC bus, wherein the second circuit pathway includes a relay formed in series between the NIC and the DC bus, and wherein the relay is configured to sense a voltage condition across the energizing coil within the conductive pathway and to open the second circuit pathway upon the energizing coil becoming energized in response to the low voltage disconnect decoupling the base-transceiver-system electronics from the DC bus within the first circuit pathway, and wherein, when the relay opens the second circuit pathway, electrical current flow to the (NIC) from the DC bus is prevented.

2. The system of claim 1, wherein the low voltage disconnect is operative to selectively decouple the base transceiver station from the DC bus upon the voltage on the first circuit pathway dropping below about 42 VDC or less.

3. The system of claim 1, further comprising a rectifier coupled to the DC bus for converting an outside supply of alternating current to direct current.

4. The system of claim 1, wherein the electrical power supplying device comprises one or more lithium metal polymer batteries.

5. A method for providing failsafe protection for equipment located at a distributed telecommunications site including a base transceiver station for enabling wireless communication with a plurality of portable communication devices and a network interface unit (NIC) for connecting the base transceiver station to a telecommunications network backbone, the method comprising:
- providing an electrical power supplying device coupled to a DC bus;
- providing a first circuit component coupled with the DC bus, the first circuit component including a base transceiver station and a low voltage disconnect connected in series between the DC bus and the base transceiver station;
- providing a conductive pathway coupled at a first end to the DC bus and coupled at a second end to a portion of the first circuit component located between the low voltage disconnect and the base transceiver system, wherein an energizing coil is formed on the conductive pathway between the first end and the second end;
- providing a second circuit component coupling the DC bus to the NIC, wherein the second circuit component includes a relay formed in series between the NIC and the DC bus, and wherein the relay is configured to sense a voltage condition across the energizing coil within the conductive pathway;
- supplying DC electrical power to the DC bus via the electrical power supplying device;
- sensing, by the low voltage disconnect, a condition where a magnitude of the DC voltage provided to the first circuit component by the DC bus is below a predetermined value;
- decoupling, by the low voltage disconnect, the base transceiver station from the DC bus;
- automatically energizing the energizing coil in response to the low voltage disconnect decoupling the base-transceiver-system electronics from the DC bus within the first circuit component;
- sensing, by the relay, the voltage condition of energized across the energizing coil of the conductive pathway, wherein the energized voltage condition of the relay is responsive to the low voltage disconnect decoupling the base transceiver station from the DC bus; and
- upon the relay sensing the energized voltage condition of the energizing coil, decoupling, by the relay, (NIC) from the DC bus.

6. The method of claim 5, wherein supplying DC electrical power to the DC bus includes supplying power from one or more lithium metal polymer batteries.

7. The method of claim 5, wherein supplying DC electrical power to the DC bus includes supplying power in a first mode of operation and a second mode of operation, the first mode of operation including receiving at the DC bus electrical power through a rectifier connected with an AC power supply, and the second mode of operation including receiving at the DC bus electrical power from one or more fuel cell type devices.

8. A system for inhibiting drain on a DC electrical power supplying device connected with telecommunications electronics at a distributed site, the telecommunications electronics including a base transceiver station for enabling wireless communication with a plurality of portable units and a network interface unit (NIC) for connecting the base transceiver station to a telecommunications network backbone, the system comprising:
- a DC bus coupled to the DC electrical power supplying device;
- a first circuit component coupled with the DC bus, the first circuit component including a low voltage disconnect connected in series between the DC bus and the base transceiver station to selectively control the flow of DC electrical power to the base transceiver station as a function of voltage realized at the DC bus, and wherein the low voltage disconnect decouples the base-transceiver-system electronics from the DC bus upon sensing a magnitude of the voltage realized by the DC bus is below a predetermined value;
- a conductive pathway coupled at a first end to the DC bus and coupled at a second end to a portion of the first circuit component located between the low voltage disconnect and the base transceiver system, wherein an energizing coil is formed on the conductive pathway between the first end and the second end;
- a second circuit component the NIC to the DC bus, the second circuit component including a relay connected in series between the DC bus and the NIC, wherein the relay is operative to sense a voltage condition across the energizing coil within the conductive pathway and to open the second circuit pathway upon the energizing coil becoming energized in response to the low voltage disconnect decoupling the base-transceiver-system electronics from the DC bus within the first circuit pathway thereby selectively preventing electrical current flow to the NIC from the DC bus upon the energized.

9. The system of claim 8, wherein the low voltage disconnect is operative to selectively control the flow of DC electrical power to the base transceiver station upon the voltage reaching the first circuit component comprising a value about 42 VDC or less.

10. The system of claim 8, further comprising a rectifier coupled to the DC bus for converting an outside supply of alternating current to direct current.

11. The system of claim 8, wherein the DC electrical power supplying device comprises one or more lithium metal polymer batteries.

* * * * *